US006834664B1

(12) United States Patent
Chiang et al.

(10) Patent No.: US 6,834,664 B1
(45) Date of Patent: Dec. 28, 2004

(54) DEVICE MAKING USE OF HEATED FLUID TO REDUCE DUST PRODUCTS IN WASTE GAS PIPELINE

(75) Inventors: Yeh-Lin Chiang, Jhunan (TW); Chen-Fun Li, Jhunan (TW); Hsin-Ho Wang, Jhunan (TW)

(73) Assignee: Kogaku Technology Inc., Miaoli (TW)

( * ) Notice: Subject to any disclaimer, the term of this patent is extended or adjusted under 35 U.S.C. 154(b) by 0 days.

(21) Appl. No.: 10/822,746

(22) Filed: Apr. 13, 2004

(51) Int. Cl.[7] .......................... F16K 49/00; F16K 51/00

(52) U.S. Cl. ........................ 137/240; 137/334; 137/338; 137/341; 137/565.23; 118/715; 118/725; 251/146

(58) Field of Search ................................ 137/240, 334, 137/338, 341, 565.23; 251/145, 146; 118/715, 719, 725

(56) References Cited

U.S. PATENT DOCUMENTS 5,484,484 A * 1/1996 Yamaga et al. ............. 118/719
5,548,944 A * 8/1996 Prochut et al. ............... 53/511
5,554,226 A * 9/1996 Okase et al. ................ 118/724
6,139,642 A * 10/2000 Shimahara et al. ......... 118/724
6,341,615 B1 * 1/2002 Zorich et al. ................. 137/14
6,383,300 B1 * 5/2002 Saito et al. ................. 118/715

* cited by examiner

*Primary Examiner*—A. Michael Chambers
(74) *Attorney, Agent, or Firm*—Rosenberg, Klein & Lee

(57) ABSTRACT

A device making use of heated fluid to reduce dust products in a waste gas pipeline comprises a chamber, a heating pipe placed in the chamber, a gas injection pipe for injecting gas into the chamber, an exhaust pipe for exhausting gas carrying away heat of the heating pipe, a connection pipe connected to the pipeline and having an open groove annularly disposed thereon, a U-shaped gas guide ring having an insertion hole for connecting the exhaust pipe, and a top lid for sealing the U-shaped gas guide ring. A wedged guide wall is disposed on the inner sidewall of the U-shaped gas guide ring. When the device is in use, gas injected into the chamber will take heat on the heating pipe away. The gas of higher thermal energy then flows from the chamber into the connection pipe and then the exhaust pipeline, hence reducing accumulation of products in the exhaust pipeline.

6 Claims, 3 Drawing Sheets

DEVICE MAKING USE OF HEATED FLUID TO REDUCE DUST PRODUCTS IN WASTE GAS PIPELINE

FIELD OF THE INVENTION

The present invention relates to a device making use of heated fluid to reduce dust products in a waste gas pipeline and, more particularly, to a device installed between a local scrubber and a pump and making use of heated fluid to reduce dust products in a waste gas pipeline.

BACKGROUND OF THE INVENTION

Many different gases are used for fabricating deep sub-micron semiconductor devices below 0.25 um to match 350 or more fabrication process steps. Gases can roughly be divided into bulk gases like nitrogen ($N_2$), oxygen ($O_2$), helium (He) and argon (Ar), process gases, and special gases.

After a fab has been built for 2~3 years, insufficient air volume of the exhaust system provided for equipments may happen to cause safety and sanitation problems and production yield reduction due to aging of pipeline, erosion, accumulation of dust products, and fabrication process expansion. More seriously, flammable gases in the pipeline or a local scrubber may even be on fire to cause a fire accident. These situations are most conspicuous in semiconductor and optoelectronic fabs. In other words, insufficient exhaust volume will result in reduction in production yield of equipment and also cause problems in safety and sanitation to profoundly perplex equipment and management personnel.

In the prior art, as shown in FIG. 1, a heating band 10 is used to heat a pipeline 16 between a pump 12 and a local scrubber 14 so that gases exhausted from a process chamber 18 won't condense, form films or accumulate dusts due to a lower temperature in the pipeline 16. However, this way of using the heating band 10 for heating may easily change the material, shape and structure of the pipeline 16 because the pipeline 16 is directly heated, and the temperature in the pipeline 16 can't be easily controlled, hence having a low dust-disposal effect and easily causing damage to the pipeline.

Accordingly, the present invention aims to provide a device making use of heated fluid to reduce dust products in a waste gas pipeline for effectively avoiding accumulation of gas molecules in a waste gas pipeline and generation of dust products.

SUMMARY AND OBJECTS OF THE PRESENT INVENTION

One object of the present invention is to provide a device making use of heated fluid to reduce dust products in a waste gas pipeline. The device makes use of a whirl gas of higher temperature injected into a pipeline between a pump and a local scrubber to effectively reduce the probability of nucleation of waste gas in the pipeline due to a sudden drop of temperature gradient and a too high concentration, thereby solving the problem of accumulation of dusts in the pipeline.

Another object of the present invention is to provide a device making use of heated fluid to reduce dust products in a waste gas pipeline. When the device is in use, a constant temperature can be kept on the surface of the chamber without the doubt of burning workers, hence having the advantage of convenient use.

To achieve the above objects, the present invention provides a device making use of heated fluid to reduce dust products in a waste gas pipeline. The device comprises a chamber, a heater whose one end has a heating pipe extending into the chamber, a gas injection pipe for injecting gas into the chamber, an exhaust pipe for exhausting gas carrying away heat of the heating pipe, a connection pipe having an open groove annularly disposed thereon, a U-shaped gas guide ring whose one inner sidewall has a wedged guide wall, and a top lid for sealing the U-shaped gas guide ring.

The various objects and advantages of the present invention will be more readily understood from the following detailed description when read in conjunction with the appended drawings, in which:

DETAILED DESCRIPTION OF PREFERRED EMBODIMENT

The present invention provides a device making use of heated fluid to reduce dust products in a waste gas pipeline. The device applies mainly to a pipeline between a vacuum pump and a local scrubber to prevent waste gas from contacting the waste gas pipeline and gas therein at a lower temperature when the waste gas is exhausted by the vacuum pump to the local scrubber.

Figure 1:
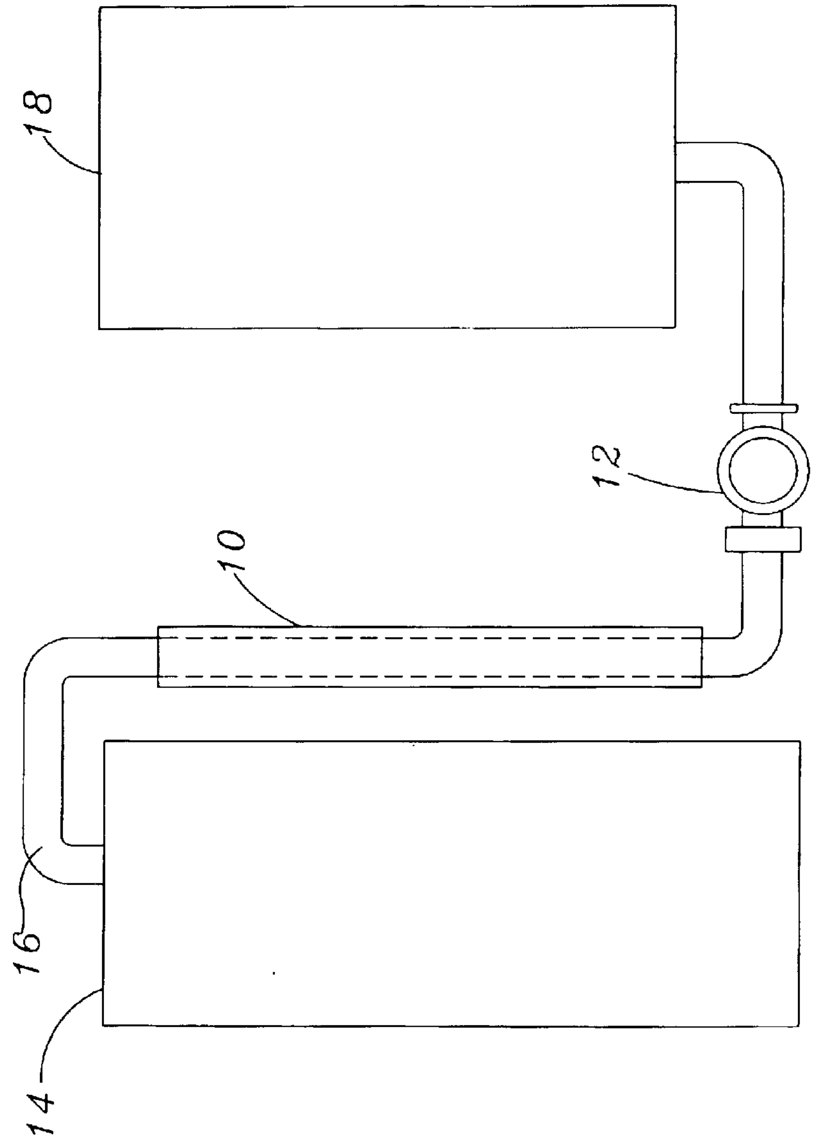
FIG.1 PRIOR ART
FIG. 1 is a diagram of a conventional pipeline heated by a heating band between a pump and a local scrubber.
Figure 2:
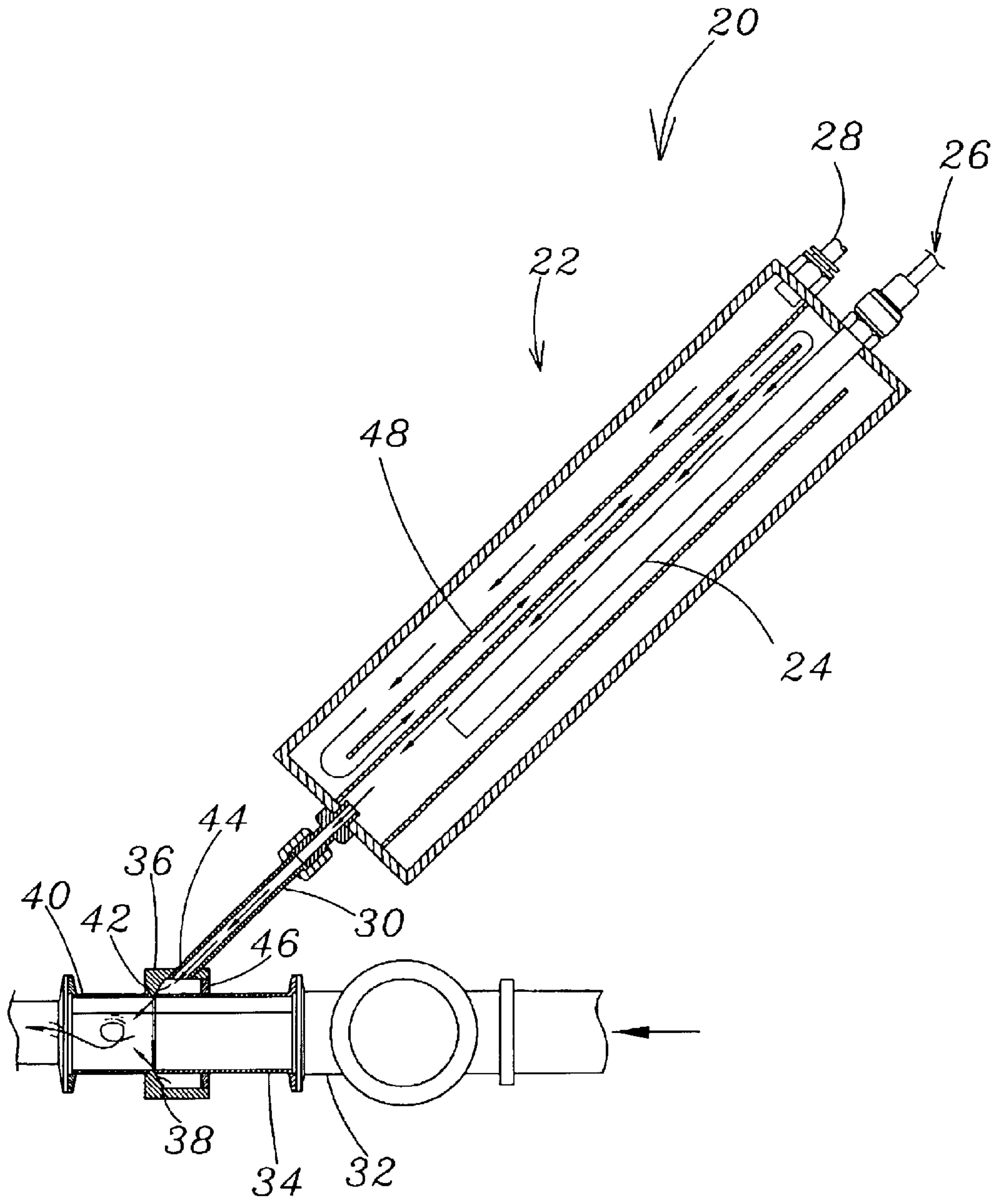
FIG. 2 is a structure diagram of the present invention.

As shown in FIG. 2, a device 20 making use of heated fluid to reduce dust products in a waste gas pipeline of the present invention comprises a chamber 22, a heater 26 whose one end has a heating pipe 24 extending into the chamber 22, a gas injection pipeline 28 on the chamber 22 for providing gas injected into the chamber 22, an exhaust pipe 30 on the chamber 22 for exhausting gas out of the chamber 22, a connection pipe 34 for connecting an exhaust pipeline 32, a U-shaped gas guide ring 36, and a top lid 46 for sealing the U-shaped gas guide ring 36. An open groove (not shown) is annularly disposed on the connection pipe 34. A 45-degrees wedged guide wall 38 is disposed on the inner sidewall of the U-shaped gas guide ring 36. When the U-shaped gas guide erring 36 is sleeved onto the connection pipe 34, the wedged guide wall 38 and a wall 40 of the open groove will form a surrounding gas flow slit 42. An insertion hole 44 is formed on the U-shaped gas guide ring 36.

The outer wall of the chamber 22 of the present invention is kept at a constant temperature without the doubt of burning workers. A plurality of gas guide walls 48 can be arranged in the chamber 22. The gas guide walls 48 are made of material with a good heat isolation characteristic like mica, aluminum dioxide, and so on. In order to more conveniently connecting the exhaust pipe 30 and the insertion hole 44, male and female threads are formed on the surface of the exhaust pipe 30 and the insertion hole 44.

Figure 3:
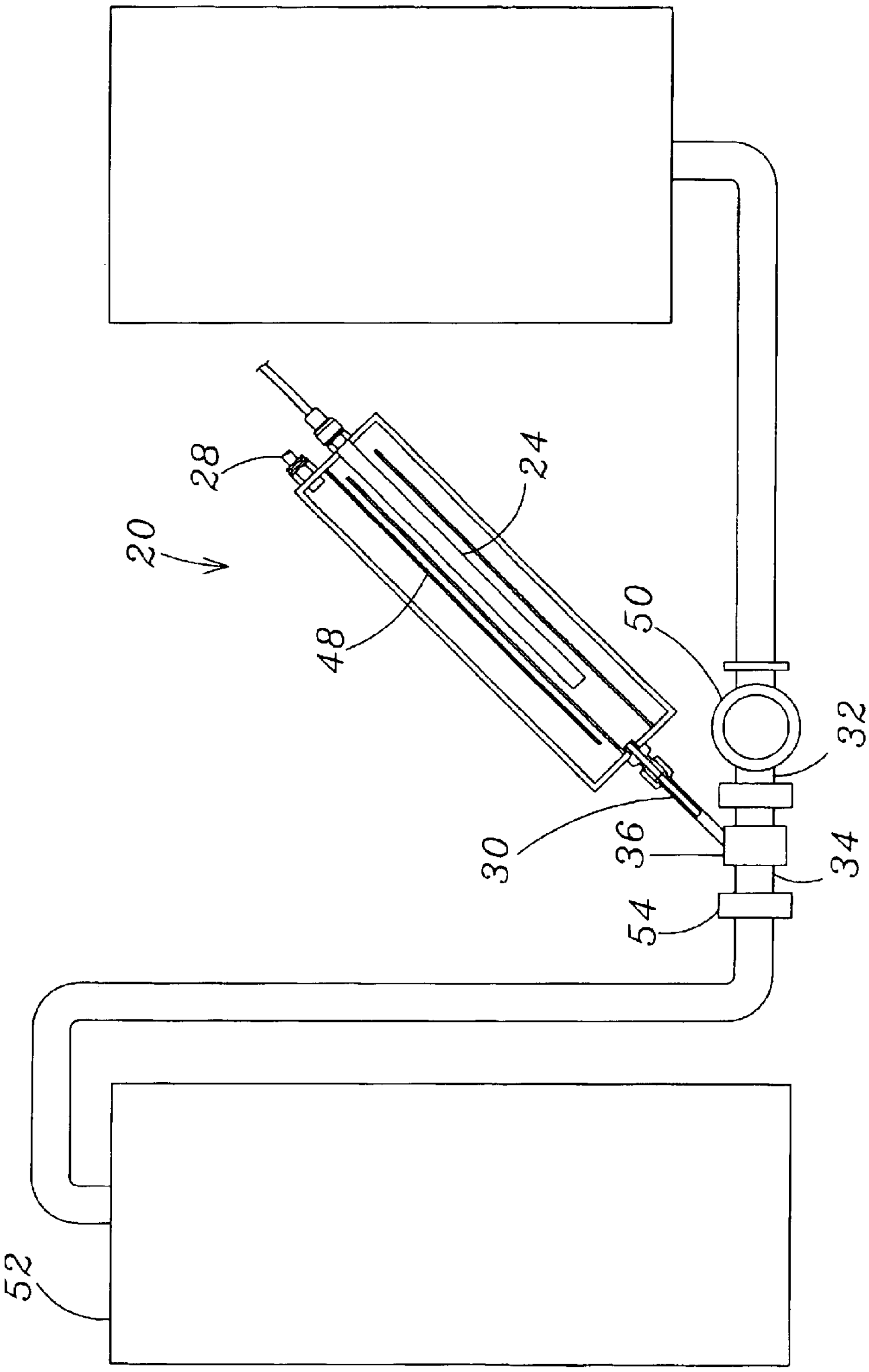
FIG. 3 is a diagram of a device of the present invention installed on a pipeline between a pump and a local scrubber.

As shown in FIG. 3, a device making use of heated fluid to reduce dust products in a waste gas pipeline of the present invention is installed a pipeline at the inlet end of a vacuum pump and a local scrubber. The device is notably enlarged for convenient illustration.

Please refer to FIG. 2 as well as FIG. 3. When the device 20 making use of heated fluid to reduce dust products in a waste gas pipeline of the present invention is engaged with the waste gas pipeline 32 between a vacuum pump 50 and a local scrubber 52, two locking devices 54 are used to connect the connection pipe 34 and the waste gas pipeline 32 for finish installation. Next, the exhaust pipe 30 is connected into the insertion hole 44. A gas that won't explode due to temperature increase like nitrogen, argon and clean air is then injected via the gas injection pipe 28. At this time, gas takes heat of the heating pipe 24 according to the loop formed by the gas guide walls 48, is exhausted via the exhaust pipe 30 and injected into the U-shaped gas guide ring 36 and then injected into the connection pipe 34 via the gas flow slit 42. A sudden drop of temperature gradient of waste gas exhausted by the vacuum pump 50 is thus reduced due to heat of the injected gas, hence effectively diluting the waste gas concentration in the pipeline and thus reducing the probability of nucleation. Moreover, because the gas flow slit 42 surrounds the whole connection pipe 34, gas flow entering the connection pipe 34 will swirl to more effectively remove dusts formed on the pipe wall.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A device making use of heated fluid to reduce dust products in a waste gas pipeline installed on a pipeline between a vacuum pump and a local scrubber comprising:

a chamber;

a heater whose one end has a heating pipe extending into said chamber;

a gas injection pipe disposed on said chamber for injecting gas into said chamber;

an exhaust pipe disposed on said chamber for exhausting gas carrying away heat of said heating pipe out of said chamber;

a connection pipe installed on said pipeline, an open groove being annularly disposed on said connection pipe;

a U-shaped gas guide ring with a wedged guide wall disposed on its inner sidewall, said U-shaped gas guide ring being sleeved onto said connection pipe, said wedged guide wall and said one sidewall of said open groove forming a gas flow slit, an insertion hole of said exhaust pipe for connecting said exhaust pipe being formed on said U-shaped gas guide ring so that gas can be injected from said chamber into said connection pipe; and a top lid installed on said U-shaped gas guide ring to seal said U-shaped gas guide ring.

2. A device making use of heated fluid to reduce dust products in a waste gas pipeline as claimed in claim 1, wherein a plurality of gas guide walls are further disposed in said chamber.

3. A device making use of heated fluid to reduce dust products in a waste gas pipeline as claimed in claim 2, wherein said gas guide walls are made of material with a good heat isolation characteristic like mica and aluminum dioxide.

4. A device making use of heated fluid to reduce dust products in a waste gas pipeline as claimed in claim 1, wherein gas used in said device is a gas that won't easily explode after heated like nitrogen, clean air or argon.

5. A device making use of heated fluid to reduce dust products in a waste gas pipeline as claimed in claim 1, wherein male and female threads can further be formed on the surface of said exhaust pipe and said insertion hole of said exhaust pipe.

6. A device making use of heated fluid to reduce dust products in a waste gas pipeline as claimed in claim 1, wherein the angle of said wedged guide wall is 45 degrees.

* * * * *